3,127,316
CARDIAC AURICULAR THERAPY WITH QUINIDINE ADENYLATE, QUINIDINE ADENOSINE DIPHOSPHATE OR QUINIDINE ADENOSINE TRIPHOSPHATE
Simon L. Ruskin, deceased, late of New York, N.Y., by Carol Farhi, New York, N.Y., Dan B. Ruskin, Miami Beach, Fla., and Milton Reder, New York, N.Y., executors, assignors to Union Carbide Corporation, New York, N.Y., a corporation of New York
No Drawing. Continuation of abandoned application Ser. No. 3,233, Jan. 19, 1960, which is a continuation of abandoned application Ser. No. 366,395, July 6, 1953. This application June 22, 1962, Ser. No. 204,646
5 Claims. (Cl. 167—65)

This invention relates to new and useful compositions of matter, and more particularly to compositions for use in the treatment of cardiac conditions, especially auricular fibrillation and auricular flutter.

It is well known that quinidine, which is a drug of the cinchona family of alkaloids, has been widely used heretofore in the treatment of certain cardiac conditions. It is generally employed in the form of its sulfate salt in dosage concentrations ranging from 400 mg. to 600 mg. every 4 to 6 hours. Such use of quinidine sulfate is accompanied by a number of untoward manifestations and particularly gastro-intestinal irritation, however, and the nausea and vomiting accompanying this condition greatly limits its effectiveness and use.

Efforts have been made, heretofore, to mitigate this limitation by administering the quinidine via intramuscular injection, but these have not proven to be effective, in that, quinidine sulfate itself is far too irritating to muscle tissue and, in addition, induces sloughing. Other salts such as the gluconate and lactate have been tried, but these are not sufficiently stable and are likely to change color on standing, and frequently exhibit spontaneous crystallization. The intramuscular administration of quinidine hydrochloride in solution in propylene glycol has proven to be somewhat more satisfactory, but the use of this composition still leaves much to be desired, since the requisite dosage concentration is large and frequently causes swelling of the buttocks at the site of injection.

The primary object of the present invention is the provision of new quinidine compositions which are particularly useful in treating cardiac conditions, and which are more satisfactory in every respect than any of the related pharmaceuticals employed heretofore, requiring substantially reduced dosage concentrations, and being appreciably more rapid in promoting desired changes in the auricular rate. The novel compositions of the invention are readily soluble in water and can be administered both intramuscularly and intravenously, without irritation and without inducing sloughing of the tissue.

The invention is based, in part, on the discovery that nucleotides of quinidine in the form of quinidine adenosine 3 or 5 monophosphate, diphosphate or triphosphate, promote a striking effect on the control of auricular fibrillation when administered in relatively small doses. For example, from as little as 30 mg. to 50 mg. of quinidine adenylate injected intramuscularly will control cases of auricular fibrillation that normally require from 200 mg. to 600 mg. of quinidine sulfate administered via the oral route. The quinidine adenylate when so administered produces no gastrointestinal irritation whatsoever. Furthermore, doses of as little as 15 to 25 mg. of quinidine adenylate when injected intramuscularly produce effects comparable to those which normally require from 400 mg. to 600 mg. of injectable quinidine hydrochloride dissolved in propylene glycol.

The unique speed of action of quinidine adenylate is significantly more rapid than that of any known compound of the general class described. Thus, following administration of a quinidine compound of the invention, electrocardiographic tests show that the beginning of the correction of auricular fibrillation occurs within only a few minutes. In contrast, quinidine sulfate and quinidine hydrochloride require about four hours to produce a peak percentage change of from 15 percent to 20 percent in the auricular rate. Quinidine adenylate produces an equivalent change within ½ hour to 1 hour.

The unique compounds of the invention are readily soluble in water and can be used both intramuscularly and intravenously. The intravenous dosage concentration ranges from about 3 to 10 mg. with the average dose being about 5 mg.

It would appear that a unique synergistic action exists between the quinidine and adenosine phosphate moieties such that only a small dose of quinidine is necessary in the presence of the adenylate grouping. Of course, one of the most serious drawbacks of normal quinidine therapy is that the overexertion of quinidine effect on the heart in patients with auricular flutter sometimes results in cardiac standstill during the change-over from cardiac arrhythmia to normal rhythm. This has led to many fatal results in quinidine therapy and has seriously retarded its usefulness. Furthermore, the large doses of quinidine previously required are often accompanied by evidences of cinchonism such as deafness, ear noises, vertigo, blurred vision and trembling. These are entirely eliminated by the use of quinidine adenylate in the substantially reduced doses required to achieve the desired therapeutic effect.

The following example illustrates one method for producing the novel adenylate derivatives of the invention:

*Example*

Two (2) grams of quinidine base and 2.1 grams of adenylic acid were dissolved in 200 cubic centimeters of hot water. The materials dissolved rapidly. The material was then filtered to clear it from a slight teurbidity. The filtrate on cooling and standing overnight crystallized out, and the crystals were then filtered and dried. The resulting compound was found to be quinidine adenylate.

In lieu of adenylic acid, other nucleotides of quinidine may be used with substantially the same results as shown in the foregoing example.

This application constitutes a continuation of former copending application Serial No. 3,233, filed on January 19, 1960, and which has since been abandoned, which application was in turn a continuation of application Serial No. 366,395, filed on July 6, 1953, and which has since been abandoned.

We claim:
1. Process for the treatment of cardiac auricular fibrillation and auricular flutter that comprises, administering to the afflicted host at a unit dosage level of at least about 3 milligrams a substance selected from the group consisting of quinidine adenylate, quinidine adenosine diphosphate, and quinidine adenosine triphosphate.

2. Process for the treatment of cardiac auricular fibrillation and auricular flutter that comprises, administering quinidine adenylate to the afflicted host at a unit dosage level of at least about 3 milligrams.

3. Process for the treatment of cardiac auricular fibrillation and auricular flutter, that comprises administering to the afflicted host at a unit dosage level of from 3 to 50 milligrams a substance selected from the group consisting of quinidine adenylate, quinidine adenosine diphosphate and quinidine adenosine triphosphate.

4. Process for the treatment of cardiac auricular fibrillation and auricular flutter, that comprises administering quinidine adenylate to the afflicted host at a unit dosage level of from 3 to 50 milligrams.

5. Process for the treatment of cardiac auricular fibrillation and auricular flutter, that comprises administering quinidine adenylate to the afflicted host at a unit dosage level of from 3 to 10 milligrams.

References Cited in the file of this patent
UNITED STATES PATENTS
2,089,227    Ruskin _____ Aug. 10, 1937